(12) United States Patent
Schuster

(10) Patent No.: US 7,698,197 B1
(45) Date of Patent: Apr. 13, 2010

(54) INDEX OF INITIAL PUBLIC OFFERINGS (IPOX) AND IPOX DERIVATIVES

(75) Inventor: Josef A. Schuster, Chicago, IL (US)

(73) Assignee: Ipox Schuster LLC, Chicago, IL (US)

( * ) Notice: Subject to any disclaimer, the term of this patent is extended or adjusted under 35 U.S.C. 154(b) by 1315 days.

(21) Appl. No.: 10/877,535

(22) Filed: Jun. 25, 2004

Related U.S. Application Data

(60) Provisional application No. 60/530,143, filed on Dec. 17, 2003.

(51) Int. Cl.
*G06Q 99/00* (2006.01)

(52) U.S. Cl. .................................................. 705/36 R
(58) Field of Classification Search ............... 705/35–40
See application file for complete search history.

(56) References Cited

U.S. PATENT DOCUMENTS

| | | | |
|---|---|---|---|
| 6,061,663 | A | 5/2000 | Bloom et al. |
| 2002/0007329 | A1 | 1/2002 | Alcaly et al. |
| 2002/0026405 | A1 | 2/2002 | Haar |
| 2003/0046203 | A1 | 3/2003 | Ichihari et al. |
| 2003/0074306 | A1 | 4/2003 | Rios et al. |
| 2003/0126155 | A1 | 7/2003 | Parker et al. |
| 2003/0130917 | A1 | 7/2003 | Crovetto |
| 2003/0172021 | A1 | 9/2003 | Huang |
| 2004/0098334 | A1 | 5/2004 | Brusso et al. |
| 2004/0133496 | A1 | 7/2004 | Hedquist |
| 2004/0181477 | A1* | 9/2004 | Sauter et al. .................. 705/36 |

OTHER PUBLICATIONS

Christian Haefke & Christian Helmstein "Neural Networks in the Capital Markets: An Application to Index Forecasting" Computational Economics 8: 1996.*
Commodity Futures Trading Commission "CFTC/SEC Agreement to Reform Shad-Johnson Accord" Apr. 23, 2001.*
Carter et al. "Underwriter Reputation, Initial Returns, and the Long-Run Performance of IPO Stocks" The Journal of Finance, vol. 53, No. 1, Feb. 1998.*

* cited by examiner

*Primary Examiner*—Thu-Thao Havan
*Assistant Examiner*—Thomas M Hammond, III
(74) *Attorney, Agent, or Firm*—Stephen C. Glazier; K&L Gates LLP

(57) ABSTRACT

Systems and techniques for providing an index of initial public offerings (IPOs) may include selecting a set of IPOs for inclusion in the IPO index (IPOX), selecting an index start date and base value, acquiring price data and weighting data for the selected IPOs, determining first adjustment factors associated with any new exclusion of an IPO from the selected set of IPOs, determining second adjustment factors associated with any new inclusion of an IPO in the selected set of IPOs, determining reconstitution dates for the index, and computing an index value based at least in part on the index start date and base value, the acquired price data and weighting data, and the determined first and second adjustment factors.

12 Claims, 10 Drawing Sheets

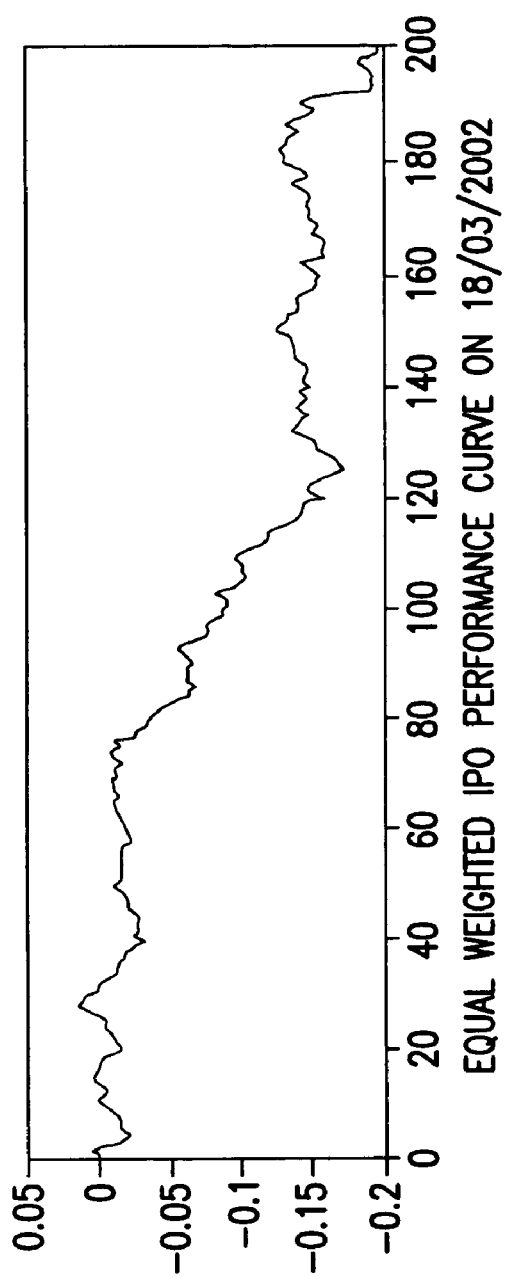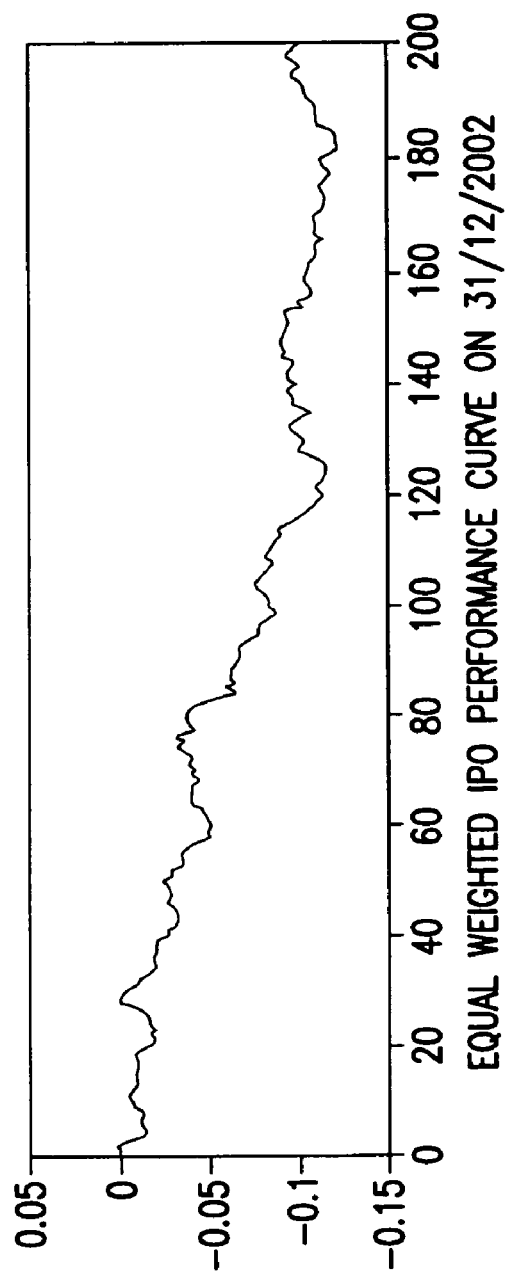

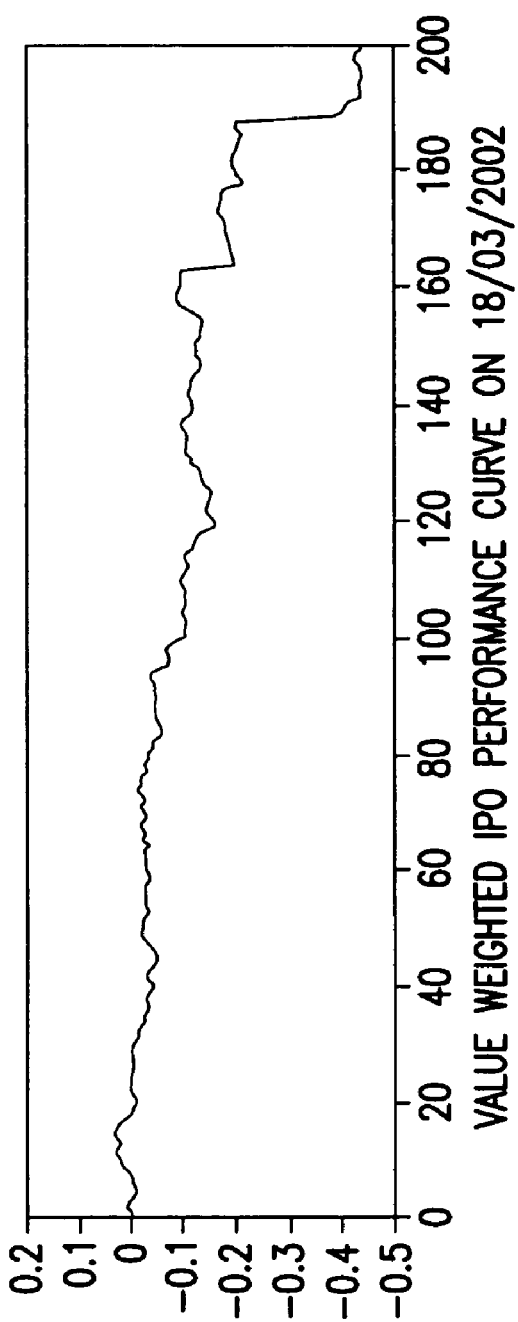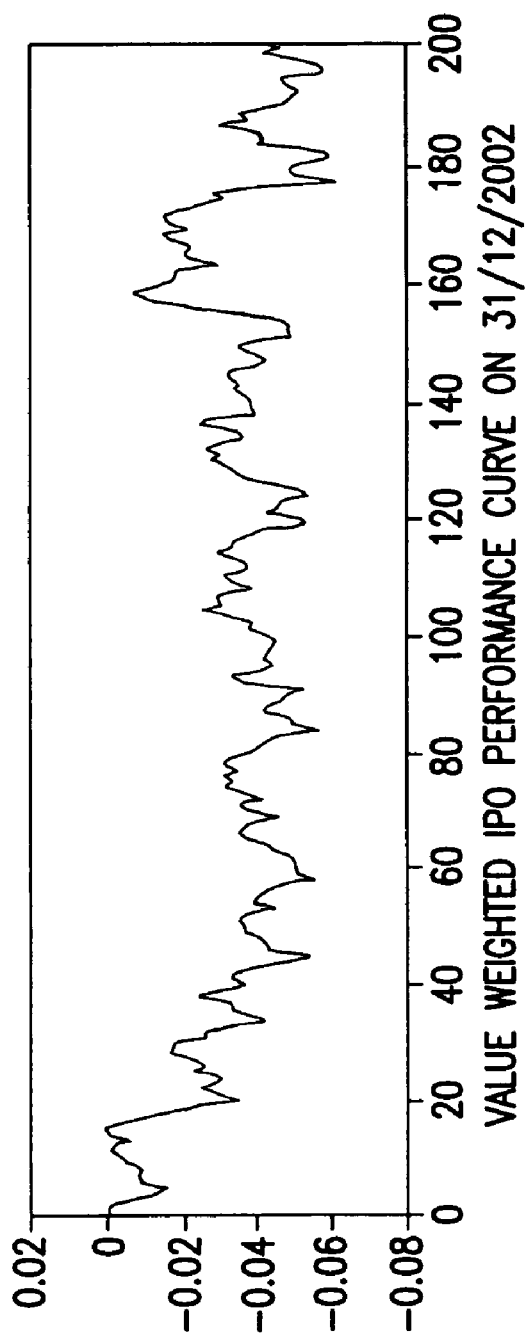

INDEX OF INITIAL PUBLIC OFFERINGS (IPOX) AND IPOX DERIVATIVES

This application claims the priority benefit of U.S. provisional patent application No. 60/530,143, which was filed on Dec. 17, 2003 and is incorporated by this reference in its entirety.

TECHNICAL FIELD

The present invention generally relates to systems and techniques for indexing financial data, and more particularly relates to systems and methods for indexing initial public offering data.

BACKGROUND

Over the past years, the empirical issues associated with the aftermarket performance of Initial Public Offerings (IPOs) have been subject to intense professional and academic debate and regulatory scrutiny. IPO shares seem, on average, to perform poorly when measured against various benchmarks over time. Long-run performance also is accompanied by poor financial accounting performance post-IPO relative to pre-IPO performance.

Another facet that has attracted much interest addresses the relation between short- and long-run IPO returns. Considerable short-run IPO overperformance has been observed. When relating the form of earnings management to IPO performance, the market takes a considerable time to respond to the fundamental message conveyed by earnings management behavior at the IPO date. Short-run IPO returns essentially are driven by factors other than fundamental factors. Investor sentiment, driven by the institutional peculiarities of the IPO market, such as underwriter price support, lock-up periods, short-selling constraints or the 25-day "quiet period" after the IPO, are driving forces behind the short-run IPO return dynamics. It takes many months for the market to catch-up to company fundamentals.

Historically, IPO activity has been closely associated with the high-risk, high return profile of companies in NASDAQ. However, market forces and some critical changes in the regulatory framework associated with Sarbanes-Oxley have caused a change in the profile of companies going public. For example, older, more mature companies going public in diverse industry sectors. The decrease in dominance of high-tech IPOs in the universe of IPOs has led to a decrease in correlation with NASDAQ.

Global issuing activity in Initial Public Offerings (IPOs) has picked up and a broad range of industries are forecasted to go public. This is being driven by the favorable performance of recently issued IPOs and fundamental shifts in the profile of US IPO companies following Sarbanes-Oxley, safeguarding higher quality listing standards and decreasing correlation of IPOs with NASDAQ.

Accordingly, an Initial Public Offering (IPO) index product is needed, which meets regulatory requirements and is designed to respond to the fundamental changes affecting the US and international IPO markets.

SUMMARY

In one general embodiment, a method of providing an index of initial public offerings (IPOs) includes: selecting a set of IPOs for inclusion in the IPO index (IPOX), IPOs being selected based on at least one eligibility parameter including a minimum market capitalization, IPOs being excluded from the IPO index after a predetermined time period; selecting an index start date and base value; acquiring price data and weighting data for the respective IPOs; determining first adjustment factors associated with new exclusion of a respective IPO from the selected set of IPOs; determining second adjustment factors associated with new inclusion of a respective IPO in the selected set of IPOs; determining reconstitution dates for the index; and computing an index value based at least in part on the index start date and base value, the acquired price data and weighting data, and the determined first and second adjustment factors.

Implementations may include one or more of the following features. For example, the IPO index may be directed to a subset of IPOs that share at least one predetermined characteristic. The at least one predetermined characteristic may be one or more of size, sector, initial return performance, public float, age, and geographic location. Respective IPOs may be included in the IPO index as of their respective first trading day. Alternatively, respective IPOs may be included in the IPO index within one or two weeks of their first trading day. The predetermined time period may be about 1,000 days. Alternatively, an IPO index may be reconstituted on a periodic basis, such as, for example, weekly, monthly or quarterly.

In another general embodiment, a method of constructing a financial product comprises: selecting an index of initial public offerings (IPOs) for the financial product; and issuing a derivative financial product based on the IPO index.

Implementations may include one or more of the following features. For example, the IPOX derivative financial product may be an option or a futures contract. The method may include buying or selling the derivative and trading the derivative. The derivative may also be selected from the group comprising exchange-traded funds (ETF), closed-end funds, open-end funds, structured derivatives and unit investment trusts.

In another general embodiment, a method of generating a performance curve associated with initial public offerings (IPOs) comprises: selecting a set of IPOs; acquiring price data for selected IPOs among the selected set of IPOs; determining decay factors associated with IPOs; and determining, over a window of time, an aggregated historical return on the selected set of IPOs based at least in part on the acquired price data and the determined decay factors.

Implementations may include one or more of the following features. For example, the method may include plotting the aggregated historical return. The selected set of IPOs may be a subset of IPOs that share at least one predetermined characteristic (e.g., size, sector, initial return performance, public float, age, and geographic location).

In another general embodiment, a method of constructing a financial product includes: selecting a performance curve associated with initial public offerings (IPOs); and issuing a derivative financial product based on the IPO performance curve.

Embodiments of the present invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DESCRIPTION OF THE FIGURES

The features and advantages of embodiments of the present invention can be understood by reference to the following detailed description taken with the following figures of embodiments of the invention.

FIGS. 4A and 4B illustrate weighted IPO performance curves according to one embodiment of the present invention.

FIGS. 5A and 5B illustrate value weighted IPO performance curves according to one embodiment of the present invention.

DETAILED DESCRIPTION

In one embodiment, an IPO index is designed to be a comprehensive representation of investable IPOs. In general, the IPO index is designed as a "tradable" index product for measuring absolute and relative performance of IPOs.

In one implementation, the IPO index gives market participants the opportunity to capture the return dynamics unique to IPOs. The IPO index classifies IPOs from the rest of the market because IPOs bare unique empirical dynamics up to at least four years or 1000 trading days after going public. Some of these empirical features concern short-run IPO overperformance, a highly skewed long-run return distribution with few extreme winners driving positive performance, significant return differences when measuring IPO returns of sub-groups of companies or the link between pre-IPO accruals management and long-run stock price performance.

The IPO index generally provides average, rather than median, exposure to IPOs, once companies are public. The underlying empirical features in IPOs (e.g., skewness of the distribution of long-run IPO returns) make the index interesting for a number of market participants with varying investment horizons, such as the retail buy-and-hold community, arbitrageurs, traders or index spreaders. Among other benefits, the application of this concept to other equity can substantially benefit international investors who seek easy access and average exposure to the active international IPO markets, developed (Europe and Pacific) and emerging (China, South Korea, etc.).

Figure 1:
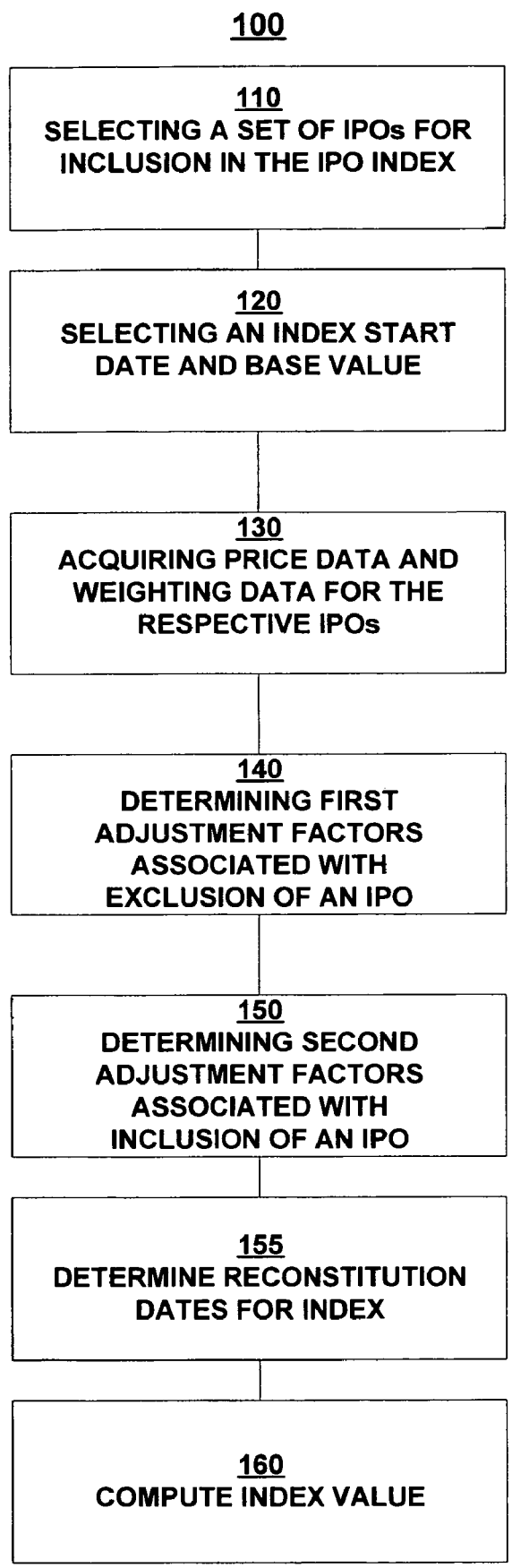
FIG. 1 illustrates a method according to one embodiment the present invention.

FIG. 1 illustrates one embodiment of a method 100 for providing an index of initial public offerings (IPOs). As shown, the method 100 includes selecting a set of IPOs for inclusion in the IPO index (step 110); selecting an index start date and base value (step 120); acquiring price data and weighting data for the respective IPOs (step 130); determining first adjustment factors associated with new exclusion of a respective IPO from the selected set of IPOs (step 140); determining second adjustment factors associated with new inclusion of a respective IPO in the selected set of IPOs (step 150); determining reconstitution dates for the index (step 155); and computing an index value based at least in part on the index start date and base value, the acquired price data and weighting data, and the determined first and second adjustment factors (step 160).

At step 110, a set of IPOs is selected for inclusion in the IPO index. In general, respective IPOs are selected based on at least one eligibility parameter including a minimum market capitalization and excluded from the IPO index after a predetermined time period. In one implementation, companies can be added to or included in the IPO index (e.g., the IPOX® Composite Index), if they meet the inclusion criteria. In general, companies may not apply for inclusion in the IPO index, and their agents (including investment bankers, investor relations and public relations firms) may not nominate them. The selections are made autonomously, using only public information, on an as-needed basis by the IPO Index Committee.

The series of IPOX® Indexes, such as the IPOX Composite Index or the IPOX-100 Index, is calculated and maintained by IPOX Schuster LLC of Chicago, Ill., and may be monitored at the website at http://www.ipoxschuster.com.

The policy for inclusion in the IPO index may take into account the potential price effects on a company's stock price from the announcement of inclusion. Namely, the companies chosen for the IPO index typically are told at the same time (e.g., on the first close) as the rest of the world through a release to financial news media. In some implementations, the inclusion of the company in the IPO index will be at the seventh trading day, or one week, from the actual announcement day. Other embodiments may use other reconstitution periods, such as monthly, quarterly or annually.

In one embodiment, to be included in the IPO index, the IPO must have a minimum required capitalization (e.g., $10 million, or $50 million) based on the market capitalization of the IPOs at the end of the first day of trading (calculated as the first close price multiplied by the number of shares outstanding). Moreover, unit offerings, ADRs, ADSs, closed-end funds, partnerships, REIT's, income deposit securities, community offerings, or preference shares may be excluded from the index.

The IPO index accounts for a significant part of the universe of US stocks. In one implementation, the IPO index creates an index of only US IPOs. In such an embodiment, foreign stocks, including dually-traded foreign-stocks traded in the US, are excluded as the behavior of such foreign stocks is heavily influenced by factors outside the US. Including such stocks could cloud the picture of the performance of the US IPO market.

In addition, companies generally do not enter the index with the original IPO offering price. Allowing IPO companies to enter the index with their original IPO offering price would lead to disturbances in the index due to the fact that the original IPO offering price is available to only a very few market investors. The series of IPOX® Indexes (e.g., the IPOX Composite Index or the IPOX-100) assumes a market environment where everybody can freely trade, for IPOs, this is only possible once traded has started.

At step 120, an index start date and base value are selected. In one embodiment, the IPO index is stated in the form of an index number, which is relative to a base period market value. For example, the market value of the IPOX® Composite Index was initialized as of Mar. 27, 1975 (the start date) at a base value of 100.00. It is noted that this IPO index, as of April 2004, has approximately 375 constituents representing a total market capitalization of about $400 billion and a total free float of about $200 billion, representing approximately 7 to 15 percent of average daily stock turnover on the major US exchanges. As of Mar. 31, 2004, the index had a total market capitalization range for individual constituents of between $2 million and $23.5 billion.

At step 130, price data and weighting data for the respective IPOs are acquired. In one implementation, the IPO index is a value-weighted index that measures the performance of IPOs in calendar time. Each security in the Index is weighted by its available total market capitalization, resulting in larger securities' price changes having a larger impact on overall Index return than smaller securities. Each company's market value is calculated by multiplying its price by the total number of shares outstanding.

In one implementation, the IPO index is a value-weighted index in calendar time and measures the performance of IPOs between the $7^{th}$ trading day on the stock market based on the then offering price and the $1000^{th}$ day anniversary on the stock market. The IPOs enter at the seventh trading day and remain in the index for 1000 trading days thereafter. Depending on IPO activity, the number of index constituents dynamically changes over time.

It is the aim of the index to track IPOs during a time when the empirical anomalies associated with IPOs persist on average. This concerns the time period between the first couple of days in trading, typically associated with extraordinarily high trading volume, and around four years post IPO (i.e. 1000 trading days).

In general, IPO activity is fluctuating over time. Accordingly, the number of securities in the Index fluctuates and the IPO index is reconstituted dynamically to reflect IPO activity with new companies entering the index while other companies automatically drop out (e.g., upon reaching their $1000^{th}$ day anniversary in the index).

In one implementation, the IPO index is adjusted based on first adjustment factors associated with new exclusion of a respective IPO from the selective set of IPOs and second adjustment factors associated with new inclusion of a respective IPO in the selected set of IPOs.

In general, corporate actions that lead to an adjustment and affect the index such as new listings, secondary offerings, mergers and takeovers, delistings and bankruptcy are immediately reviewed. If an IPO was delisted before its $1000^{th}$ day anniversary in the index, it is computed until the delisting day. Illiquid stocks are deleted if their illiquidity is due to: (1) three 21-day trading intervals of non-trading or (2) suspension from trading. A company that has filed for bankruptcy is deleted from the index based on either the traded stock price on the primary market, if available, or else the OTC stock price. In case of mergers, acquisitions or takeovers, if the acquirer is a non-IPO and the target an IPO and Index constituent, then the combined company does not qualify for index membership. If the acquirer is an IPO and the target is a non IPO and Index constituent, then the combined company does qualify for Index membership. If both the acquirer and target are IPOs and Index constituents, the combined company is eligible for Index membership and the target company is subsequently removed from the index.

At step 140, first adjustment factors associated with new exclusion of a respective IPO from the selected set of IPOs are determined. In one implementation, the first adjustment factors $A^{n+1}$ are calculated according to the following formula:

$$A^{n+1} = \frac{\sum_{i=1}^{n} P_{i,t} \times Q_{i,t}}{\sum_{i=1}^{n-1} P_{i,t} \times Q_{i,t}}$$

where, it is assumed that the number of companies at time=t is n. At time t+1 a company labeled n gets de-listed or exceeds the time that any IPO can stay in the IPO index; and where $P_{i,t}$ and $Q_{i,t}$ are the price and weighting (number of shares) of the $i^{th}$ constituent in the index on the day T.

At step 150, second adjustment factors associated with new inclusion of a respective IPO in the selected set of IPOs are determined. In one implementation, the second adjustment factors $A^{n+1}$ are calculated according to the following formula:

$$A^{n+1} = \frac{\sum_{i=1}^{n} P_{i,t+1} \times Q_{i,t+1}}{\sum_{i=1}^{n+1} P_{i,t+1} \times Q_{i,t+1}}$$

where, it is assumed that the number of companies at time=t is n. At time t+1 a company labeled n+1 gets listed; and where $P_{i,t}$ and $Q_{i,t}$ are the price and weighting (number of shares) of the $i^{th}$ constituent in the index on the day T.

At step 155, reconstitution dates for the index are determined. The index may be reconstituted on a periodic basis, such as, for example, weekly, monthly, quarterly or annually.

At step 160, an index value based at least in part on the index start date and base value, the acquired price data and weighting data, and the determined first and second adjustment factors is computed. In one implementation, the index value is based at least in part on the index start date and base value, the acquired price data and weighting data, and the determined first and second adjustment factors according to the following formula:

$$I_T = \frac{\sum_{i=1}^{n} P_{i,T} \times Q_{i,t}}{\sum_{i=1}^{n} P_{i,0} \times Q_{i,0} \prod_{t=1}^{T} A_t}$$

where, $I_0$, is the index at the date of reference (base date).

$P_{i,0}$, $Q_{i,0}$, are the price and weighting (number of shares) of the $i^{th}$ constituent in the index on the base date.

$I_T$ is the index level calculated at day T after the base day.

$P_{i,t}$, $Q_{i,t}$, are the price and weighting (number of shares) of the constituent in the index on the day T.

$$\prod_{t=1}^{T} A_t$$

is the weighting adjustment factor (for IPOs, secondary issues, etc.)

The adjustment factor $A_t$ for the index with the new IPO is given as:

$$A_t = \frac{\sum_{i=1}^{n} P_{i,t-1} \times Q_{i,t}}{\sum_{i=1}^{n+1} P_{i,t-1} \times Q_{i,t-1}}$$

where, $P_{i,t}$, and $Q_{i,t}$, are the price and weighting (number of shares) of the $i^{th}$ constituent in the index on the day T.

FIGS. 2 through 6 illustrate the historical performance of one embodiment of an IPO index (e.g., the IPOX® Composite Index). In this embodiment, IPOs enter the IPOX® Composite Index at the seventh trading day on the stock market. Company values are calculated based on the market capitalization at the seventh trading day.

Figure 2A:
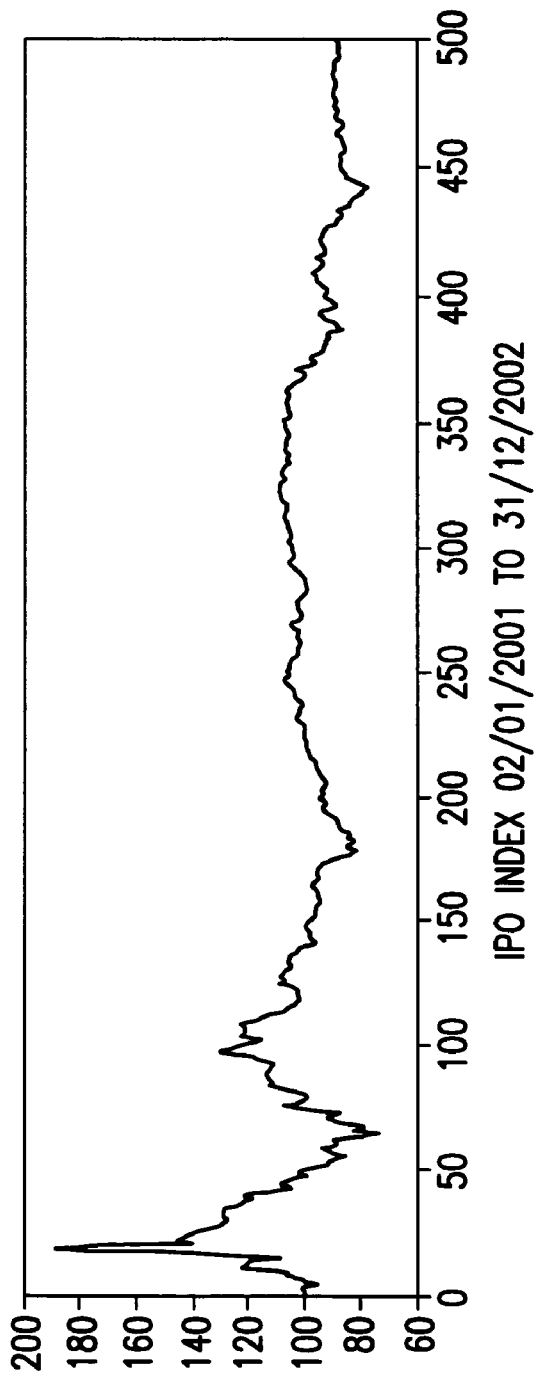
FIG. 2A and FIG. 2B illustrate the performance of an IPO index according to one embodiment of the present invention.
Figure 2B:
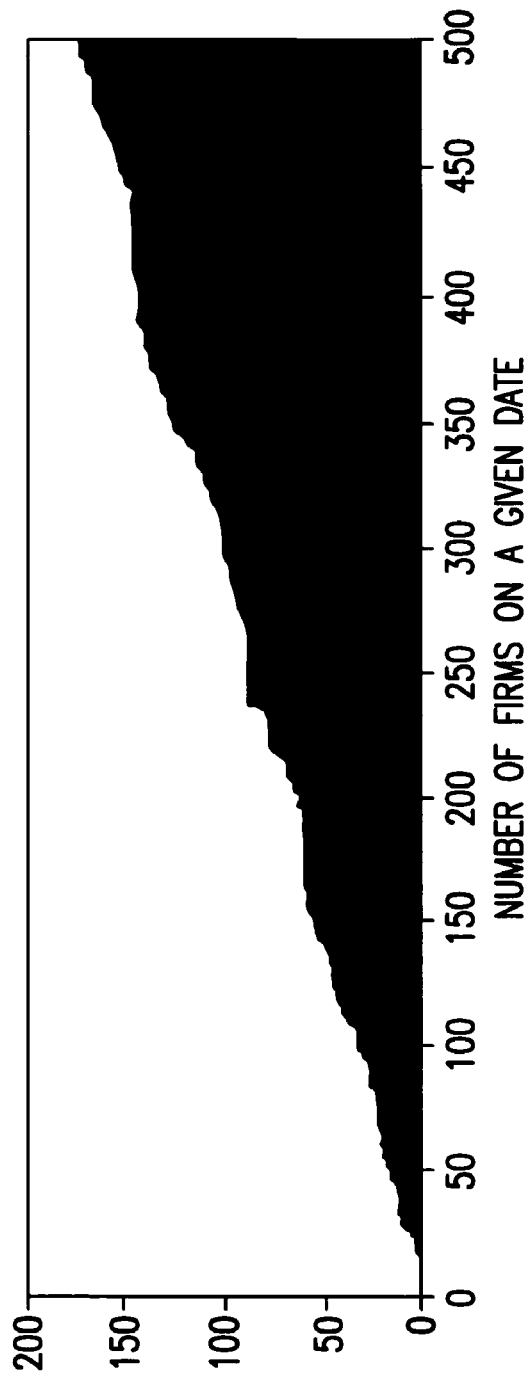

FIG. 2 illustrates an IPO index according to one embodiment of the present invention. FIG. 2A is a graph that shows the value of the IPOX on the Y-axis, and the number of days from the date of inception of 2 Jan. 2001 on the X-axis. FIG. 2B is a graph that shows the number of firms in the IPOX on the Y-axis, and the X-axis is the same as for FIG. 2A.

Figure 3:
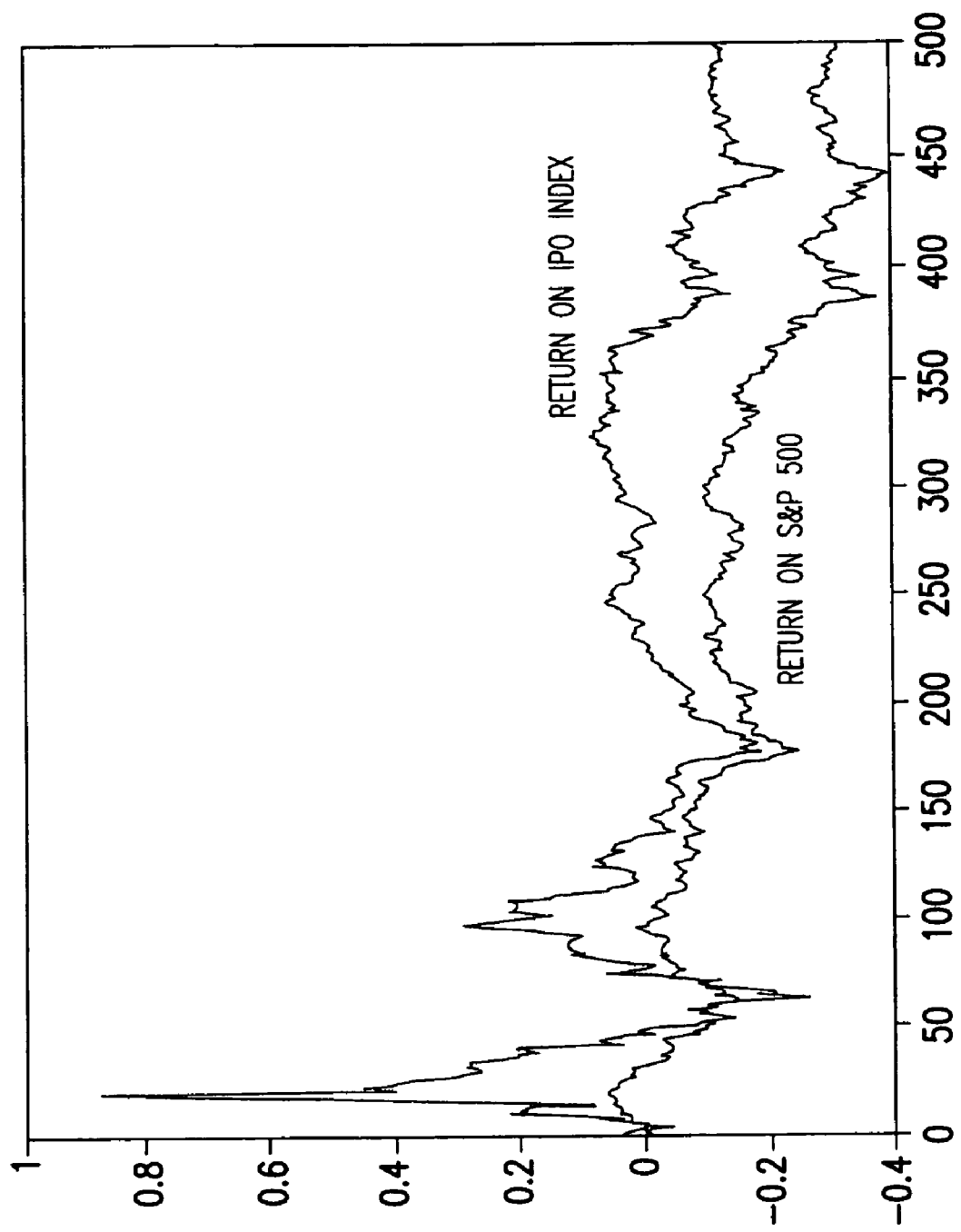
FIG. 3 illustrates relative performance of an IPO index according to one embodiment of the present invention.

FIG. 3 illustrates relative performance of an IPO index according to one embodiment of the present invention. The Y-axis shows the cumulative returns since the start date of the IPOX and the S&P 500, respectively, and the X-axis is the same as for FIG. 2A.

As shown, an average exposure to IPOs from the seventh trading day until their 1000$^{th}$ anniversary on the stock market through the IPO Composite Index provides positive results when compared to an average exposure to other indexes over time. For example, one embodiment of an IPO index (e.g., the IPOX® Composite Index or the IPOX-100 Index) outperformed some of the major benchmarks at a lower level of risk.

It is also noted that there is an appreciable drop in the correlation of the IPOX® Composite Index with high-tech indexes such as the NASDAQ. This is caused by a fundamental change in the IPO market with more mature companies in sectors other than high-tech going public. This trend is expected to increase in momentum during the next years.

In one implementation, the financial product may include a family of IPO indexes. The family of IPO indexes may include, for example, an IPO composite index, which is a capitalization-weighted price index calculated in real-time covering the US market and provides a broader perspective on IPO performance. The family may include IPO indices for European and Asian Markets. The family also may include cash index derivative products to have participation from the cash market (e.g., ETF's, index funds, mutual funds, closed-end funds, open-end funds, index annuities, equity linked notes, etc.) and from derivatives markets.

In addition, a number of specialized sub-indices, such as the IPOX-100 Index which is reconstituted quarterly, may be established measuring IPO performance based on issuing characteristics such as market capitalization at the IPO date (size), sector, initial return performance (IP), public float (PF), age and state of issuance.

Table 1, shown below, shows one embodiment of a family of IPO indices.

TABLE 1

| | | Composite Index Specialized IPO Indexes | | | |
|---|---|---|---|---|---|
| Size | Sector | Initial Return Performance | Public Float | Age | State |
| Larger IPOs | New Economy | IP high | PF Large | Age old | East Coast |
| Medium IPOs | Old Economy | IP medium | PF medium | Age medium | Mid-West |
| Small IPOs | | IP low | PF low | Age young | West-Coast South |

As described, the IPO index (e.g., the IPOX® Composite Index) provides an alternative way to make size, style and sector decisions in IPOs. It paves the way for IPO investing in the US and other international regions at a time of increased market demand for IPOs. The IPO index pools IPOs into a separate tradeable equity sector with unique empirical features and comparable performance.

The IPO index (e.g., the IPOX® Composite Index) is based on the premise of a long-term continuation of US style equity culture whereby IPO activity plays an important part in the corporate financing decision of established companies, entrepreneurs, venture capitalists or private equity. If there is no IPO activity for a period of four years, changes in the index will reflect the changes in the money market account.

In addition, the IPO index is designed so that it does not fail Commodity Futures Trading Commission (Commodities Futures Trading Commission) requirements on any given trading day. The Commodity Futures Trading Commission requirements may include, for example, that there are more than nine firms, one firm has not more than 30% weight, and the top five firms have not more than 60% weight.

In another general embodiment, the IPO index is a broad based index, wherein it satisfies Commodity Futures Trading Commission requirements for a broad based index. The Commodity Futures Trading Commission requires that in a broad based index more than fifteen firms must be represented in the index, the weight of the firm with the highest weight in the index is less than 30% of the overall weight of the index, the combined weight of the top five firms in the index is less than 60% of the overall weight of the index, and that the dollar value of the daily trading volume of the firms in the bottom 25% of the index by weight is greater than $50,000,000. The IPOX® Composite Index has been retro-tested and been found empirically to be compliant with the Commodity Futures Trading Commission requirements for a broad based index. However, other indexes and associated methods may satisfy the Commodity Futures Trading Commission requirements for a broad based index.

In another general aspect, an IPO index Performance Curve (PC) is a return index in event time which represents a term structure of the historical buy-and-hold returns of a portfolio of IPOs. In general, the IPO index PC is a comprehensive representation of investable IPOs structured in event time for measuring the buy-and-hold return performance of IPOs to give market participants the opportunity to capture the dynamics in aftermarket IPO returns.

In one implementation, the IPO index PC is a return index in event time that captures the return profile of average IPO performance from the seventh trading day through the $1000^{th}$ trading day anniversary on the stock market. It represents a term structure of the historical returns of a portfolio of IPOs and is designed to address the empirical anomalies associated with the aftermarket performance of IPOs.

It is important to note that IPO index measures the buy-and-hold performance of IPOs from the first close to the $t^{th}$ day anniversary of the stock market. When accounting for the size of the index constituents, the IPO index PC accounts for a significant part of the universe of US stocks, both in terms of market capitalization and traded volume generated from constituents stocks. For example, the IPOX® Composite Index PC currently represents between 7 and 15 percent of average daily trading volume of the universe of US stocks.

The IPO index PC also may be the basis for a number of derivative products, whereby market participants can exploit and hedge the empirical anomalies associated with IPO aftermarket performance. One category of derivative products could be 1) futures and options based on the IPO index PC, 2) a spread between the performance curve and the performance of newly issued individual IPOs, and 3) the spread between two different points on the performance curve could be alternative product categories.

The products associated with the IPO index PC provide market participants with the opportunity to exploit and hedge the well-reported empirical features in IPOs. Market participants with diverse investment objectives are likely to benefit from the availability of IPO index PC derivatives. These include investment bankers for hedging underlying IPO stock exposure and speculators who engage in forecasting cumulative IPO activity. Moreover, retail investors and investment funds who use IPO index PC products for hedging underlying exposure or speculators and hedge funds and investment institutions which seek direct exposure to the aftermarket return dynamics in IPOs, are also likely to benefit from the use of IPO index PC products.

The IPO index PC methodology can be transferred to other international markets, developed or emerging. The concept is interesting for investors with varying investment horizons, such as the retail buy-and-hold community and fund managers who seek an underlying exposure to IPOs and IPO activity. The application of this concept to other markets can also substantially benefit international investors who seek easy protection of their underlying exposure in international IPOs and exposure to the empirical anomalies.

The calculation of one embodiment of an IPO index PC is explained in detail below. The basic concept of the IPO index PC is different to other indices in that it is a return index in event time. An event time index measures the aggregate buy-and-hold performance of a portfolio of stocks with reference to an event. Examples of such events could be the IPO date, earnings announcements, secondary offerings or stock splits.

In the case of one embodiment of the IPO index PC, the event is the IPOs first close on the stock market. There are typically no deletions in an event-time index. However, the scenario of the decaying factor going to zero towards the IPOs $1000^{th}$ trading day on the stock market, can be considered as a deletion. The main advantage of constructing and index in event time is that perceived stock market anomalies are best observed. A calendar-time index, in contrast, measures the aggregate buy-and-hold performance of a portfolio of stocks with no reference to any point in event-time. All major indices are constructed in calendar-time. An advantage of a calendar-time index is its dynamic nature.

In one embodiment, the IPO index PC includes a decaying factor, which takes into account the dynamic nature of the IPO market and the changing intelligence of the IPO market. This decaying factor introduces a time-dependent weighting into the index, such that the more recent IPOs have a higher weighting than past IPOs. This feature can be thought of as a time-dependent weighting, i.e. the weighting of the index constituents decreases with time. By using a decaying factor, the static nature of an event time index is reduced.

In general, the IPO index PC is a time-dependent return index in event time that measures the average buy-and-hold performance of IPOs from the first day of trading to the $t^{th}$ day anniversary on the stock market. The time dependence is captured by a decaying factor, which reduces the companies weighting in the index over time.

For a portfolio with n IPOs at a given time, each IPO was issued at a different point in time and therefore has a limited history with reference to its issue date. In one implementation, an average return on a portfolio of IPOs 't' days after its issue can be represented as follows:

$$r_t = \frac{\sum_{i=1, T_i > t} \log \frac{p_{i,t}}{p_{i,0}}}{C(\sum i : T_i > t)}$$

$$r_t = \frac{\sum_{i=1, T_i > t}^{n} MV_{i,0} \times \log \frac{p_{i,t}}{p_{i,0}}}{C(\sum MV_{i,0} : T_i > t)}$$

where, $r_t$ is the aggregate historical return on a portfolio of IPOs, t days after their first trading day. The first equation represents the return in an equally weighted portfolio and the second is a value weighted portfolio.

In the numerator, there is a sum of all the return of the firms that had an IPO issue more than t days before day T.

$P_{i,t}$ is the price of a share of $i^{th}$ firm, t days after the IPO issue.

$P_{i,0}$ is the price of a share of $i^{th}$ firm at then end of the first trading day.

$C(\Sigma i : T_i > t)$ is the total number IPOs that have been trading for more than t days.

$C(\Sigma MV_{i,0} : T_i > t)$ is the total market capitalization of the stocks in the performance index on their first trading day. Also all these stocks have been trading for at least t days after day T.

FIGS. 4A and 4B illustrate weighted IPO performance curves according to one embodiment of the present invention. The X-axis of the graphs shows post IPO trading days. The Y-axis of the graphs shows unannualized raw returns.

FIGS. 5A and 5B illustrate value weighted IPO performance curves according to one embodiment of the present invention. The X-axis of the graphs shows post IPO trading days. The Y-axis of the graphs shows unannualized raw returns.

Figure 6:
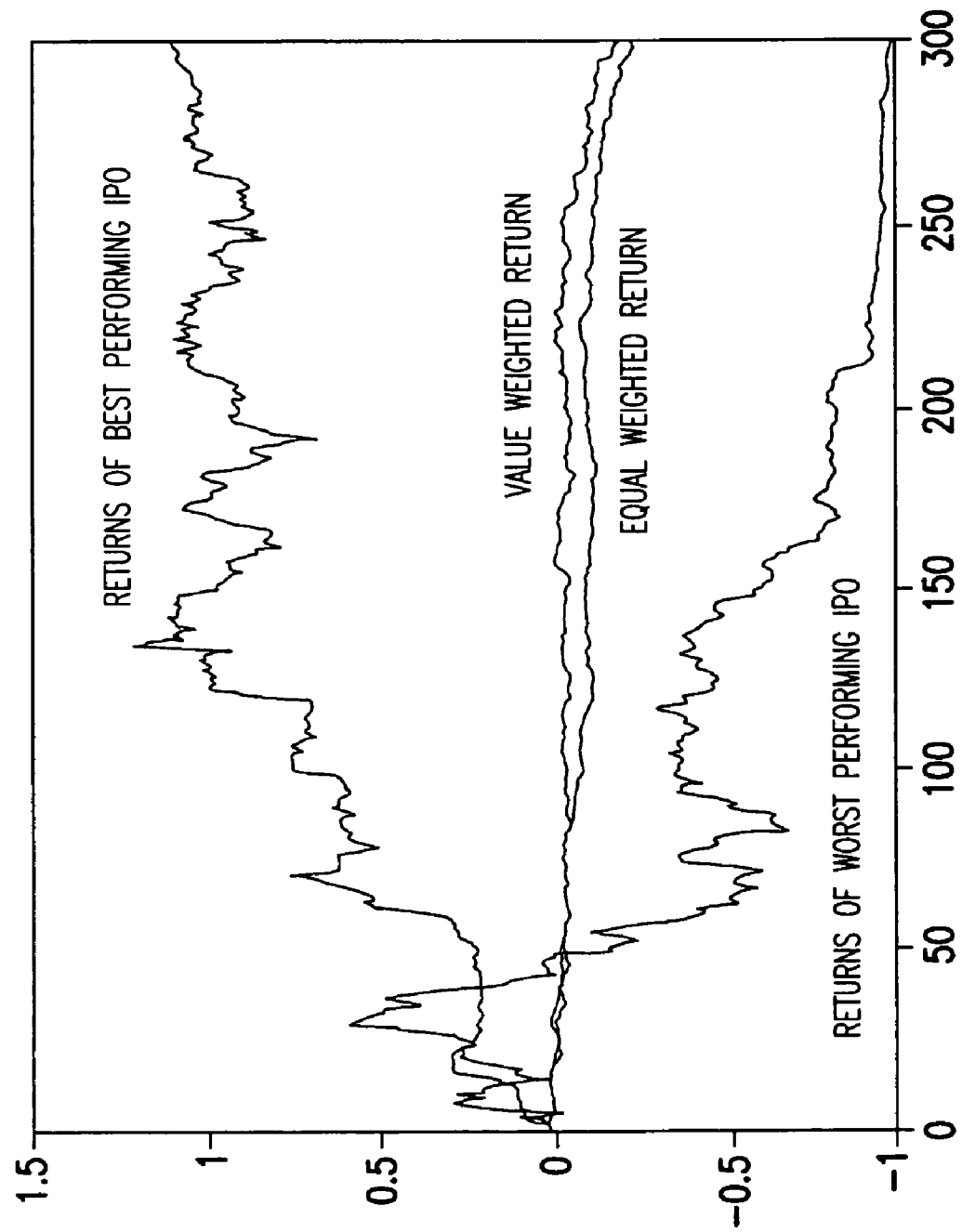
FIG. 6 illustrates a comparison of IPO performance curves according to one embodiment of the present invention.

FIG. 6 illustrates a comparison of IPO performance curves according to one embodiment of the present invention. The X-axis shows post IPO trading days. The Y-axis shows unannualized raw returns.

In some implementations, the average return on a portfolio of IPOs 't' days after its issue also may be represented as follows:

$$r_t = \frac{\sum_i D_i \times \frac{p_{i,t} - p_{i,1}}{p_{i,1}}}{\sum_i D_i}$$

where, $r_t$ is the aggregate historical return on a portfolio of IPOs, t days after their first trading day.

$P_{i,t}$ is the price of a share of $i^{th}$ firm, t days after the IPO date.

$P_{i,1}$ is the price of a share of $i^{th}$ firm, t days after the IPO date.

$D_i$ is a decaying factor for an $i^{th}$ firm.

The inclusion of a decaying factor makes an event time index dynamic, which otherwise becomes static as new IPOs enter the index over time without deletions.

$$D_i = 1 - 0.001 \exp(0.07 * t_i)$$

One of the main criteria for the choice of the decaying factor is that the function representing the decaying factor should be decreasing with time, i.e. the slope should be negative. The decrease in this function should increase in magnitude over time, i.e. the second derivative of the function with respect to time should be negative as well. This implies that the decaying factor should be a concave rather than a convex function.

Despite fluctuations in the empirical dynamics of IPO aftermarket performance, the fundamental nature of the IPO index PC remains unchanged. It allows market participants to engage in the buy-and-hold performance of IPO shares in event time once those companies are public. This is interesting because of the well-know empirical anomalies associated with IPOs. These empirical anomalies can typically only be captured in event time, rather than calendar time.

Figure 7:
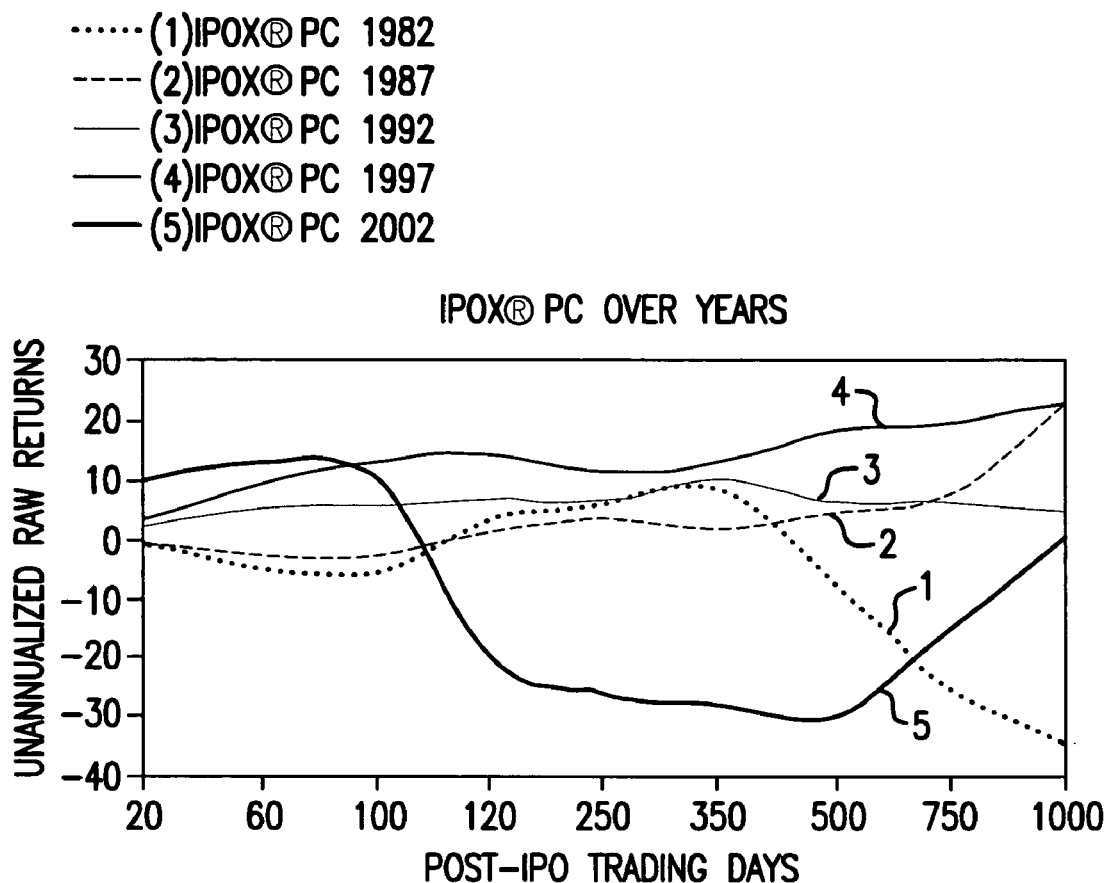
FIG. 7 illustrates the IPO index Performance Curve (PC) at various points in time according to one embodiment of the present invention.

FIG. 7 shows the IPOX® PC at various points in time at the end of the respective calendar year. The X-axis represents the number of trading days post-IPO date, while the Y-axis is the aggregate (unannualized) raw return over the respective period. Each curve represents an aggregate return of all IPOs with a decaying factor prior to the date respective of the curve. For example, the curve labeled IPOX® PC 1982 (line 1) represents the term structure on Dec. 31, 1982 based on all IPOs prior to this date. Each curve exposes the dynamic nature of IPO aftermarket returns. Moreover, the different curves show a dynamic nature of the term structure. The curves also underline that negative IPO aftermarket performance is a time-varying phenomenon.

Figure 8:
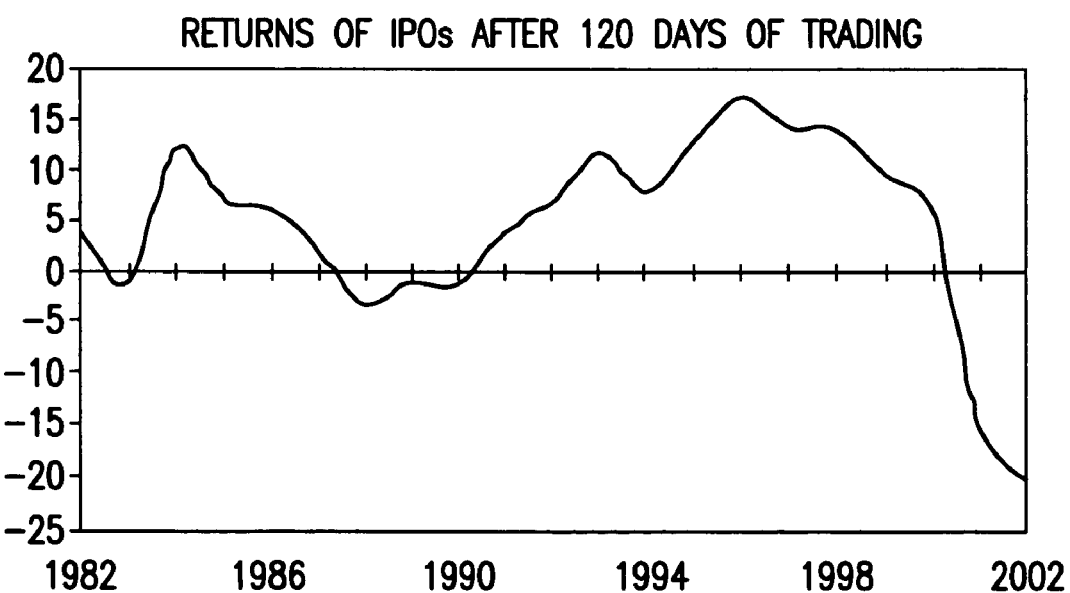
FIG. 8 illustrates settlement of a futures contract base on an IPO index PC according to one embodiment of the present invention.

FIG. 8 illustrates historical dynamics of a futures contract on the IPO index PC. The settlement of a futures contract on a return performance over a six-month (120 trading days) post-IPO period based on IPOX® PC is depicted.

As shown, IPOs up to the mid-1980s and between 1990 and 1997 performed significantly better during the first 120 trading days than IPOs during other periods. The sharp fall of the index from 1998 can be associated with the large number of Internet-related IPOs which subsequently performed poorly during the first 120 trading days.

In another general embodiment, an IPO index Underpricing Indicator (UPI) allows market participants to capture the actual and expected nominal value of underpricing (i.e. "the money left on the table"). To take into account the medium- to long-run horizon of the IPO market, the IPO index UPI measures the total "money left of the table" for a period of one year. The IPO index UPI addresses an economically significant part of the market.

The IPO index UPI gives market participants the opportunity to have average exposure in IPOs before going public by buying or selling the expected cumulative amount of underpricing which occurs during the contract time. Participation in the initial IPO market is typically highly selective. This feature makes the IPO index UPI applicable to different market participants, such as investment bankers who need to hedge underlying exposure in IPO stock, companies which want to go public and hedge against their offering price, speculators who engage in gauging IPO activity, retail investors seeking exposure in the initial market action in IPOs or investment funds which are being allocated stocks at the IPO price and want to hedge their exposure in IPO stock or alternatively replacing their "flipping" activity by an exposure in the IPO index UPI.

One embodiment of an IPO index UPI calculation is explained below. In general, the IPO index UPI captures the cumulative profit/loss between the offering price and the first close of IPOs within a period of time.

In one implementation, the IPO index UPI is an index measuring the cumulative "money left on the table" on IPOs during a period of time. The total amount of the underpricing of an IPO, i.e. the "money left on the table" by an IPO, is defined as the difference of the closing price on the first-day of trading, less the initial offer price of the IPO, multiplied by the number of shares offered. In other words, this is the first-day profit received by investors who were allocated shares at the initial offer price. It represents a wealth transfer from the original pre-IPO shareholders of the issuing firm to the initial IPO investors who were allocated IPO shares at the initial IPO price.

In one implementation, the following formula is representative.

$$I_t = \frac{\sum_i^n MLOT_i}{1,000,000,000}$$

$$MLOT_i = (P_{i,1} - P_{i,o}) \times Q_i$$

where, $I_t$, is the IPO index UPI at the date of reference=t.

$MLOT_i$, is the cumulative amount of "Underpricing" or "Money Left On the Table" during the contract period for the $i^{th}$ constituent.

$P_{i,1}$ is the closing price of the $i^{th}$ constituent in the index at day t=1.

$P_{i,0}$ is the final offering price of the $i^{th}$ constituent at the offering date t=0.

$Q_i$ is the total number of IPO shares issued (excluding potential overallotment options) for the $i^{th}$ constituent.

In general, the IPO index UPI allows exposure to the price dynamics associated with initial IPO returns as well as the underlying IPO activity, which is highly cyclical and generally depends on the level of the stock market. More specifically, fluctuations in the IPO index UPI index can be attributed to the number of companies going public, offering size and the average underpricing.

Figure 9:
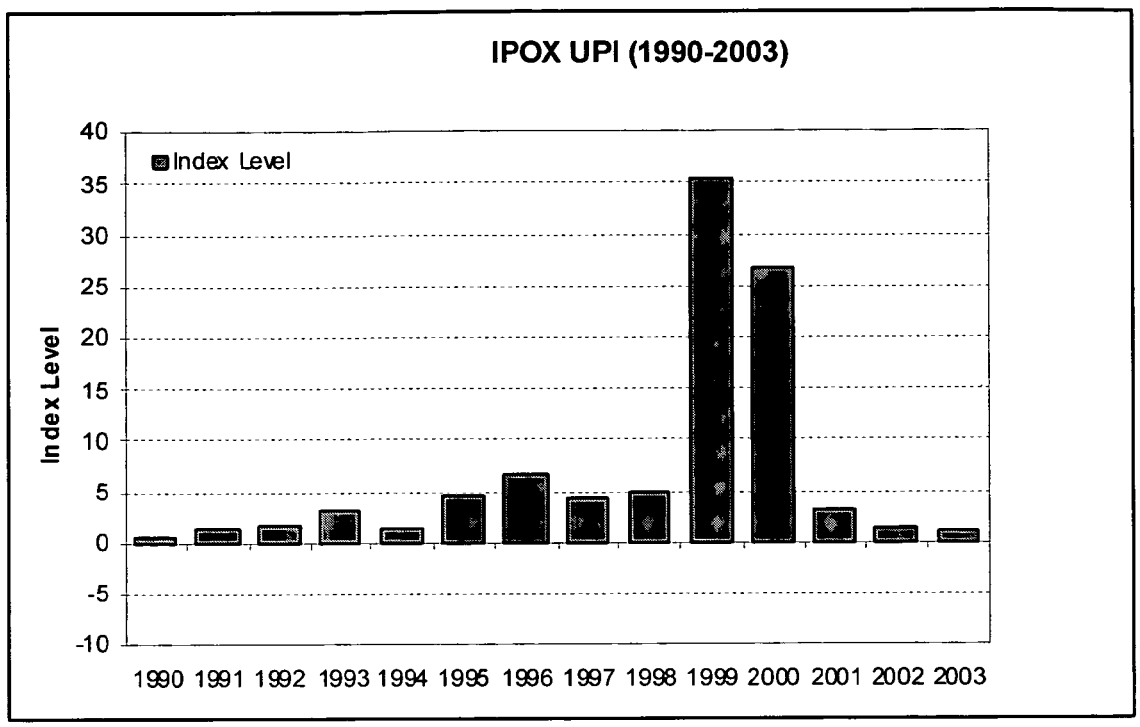
FIG. 9 illustrates IPO index UPI levels according to one embodiment of the present invention.

FIG. 9 illustrates IPO Index UPI levels according to one embodiment of the present invention. The Y-axis shows the index level for each year on the X-axis.

Figure 10:
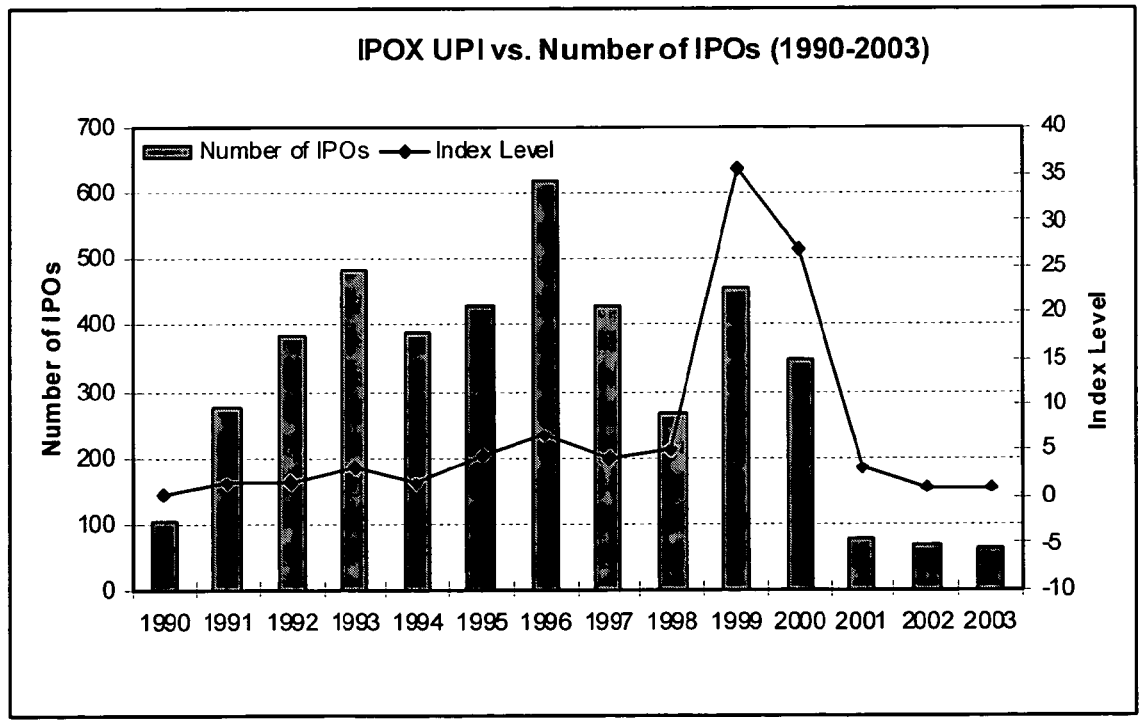
FIG. 10 illustrates IPO index UPI levels verses number of IPOs according to one embodiment of the present invention.

FIG. 10 illustrates IPO Index UPI levels verses the number of IPOs according to one embodiment of the present invention. The left scale of the Y-axis shows the number of IPOs and the right scale of the Y-axis shows the index level. The X-axis shows the year.

In general, the factors that underline the fundamental nature of the IPO index UPI have not changed over time: The IPO offer price, on average, diverges substantially from the companies first close on the stock market.

Much of the money left on the table in the late 1990's was associated with very large offering with moderate underpricing. Namely, most of the index changes during 1999 and 2000 were contributed to the flurry of internet offerings in 1999 and 2000 that have rocketed in price on their first day of trading.

With the downturn in equities and the intense regulatory scrutiny towards initial IPO pricing, the average amount of money left on the table during the past three years fell back to levels seen for much of the 1990s, with the largest IPOs accounting for most of the nominal amount of underpricing.

As of Dec. 31, 2003, the value of one embodiment of the IPO index UPI contract represented a value of 1.12, representing the cumulative money left on the table of the 65 IPOs during 2003, $1.12 billion. The "money left on the table" for the individual stocks during 2003 ranged between negative $13 million to positive $338 million.

In one embodiment, a derivatives contract can be designed with periodic expiration giving market participants an opportunity to exploit the dynamics associated with initial IPO returns and total IPO activity.

Figure 11:
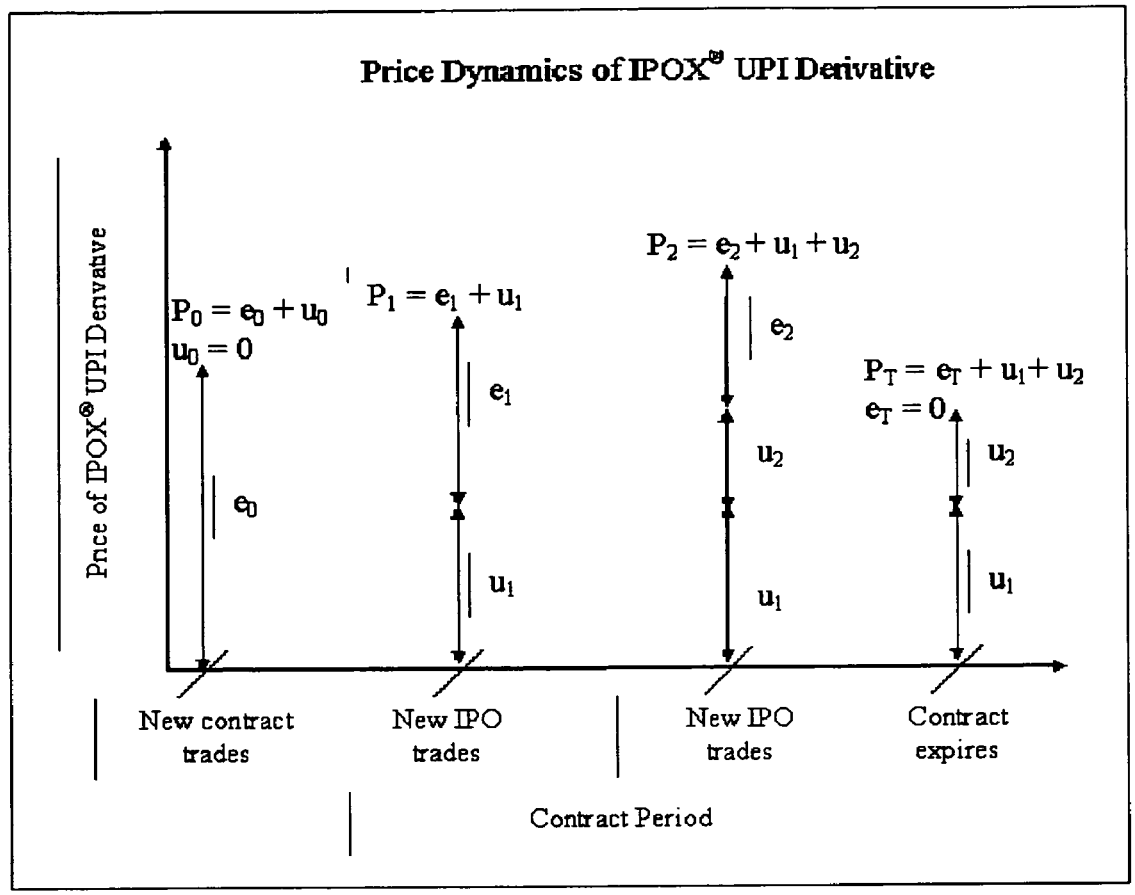
FIG. 11 illustrates price dynamics of an IPO index UPI derivative according to one embodiment of the present invention.

FIG. 11 illustrates price dynamics of an IPO index UPI Derivative according to one embodiment of the present invention. The Y-axis shows the price of an IPOX Index UPI Derivative Contract. The X-axis shows a general time line with specific events relative to such a contract. As shown, the dynamics of an IPO index UPI Derivatives Contract may include the following:

New Contract trades: At the beginning of the contract period, the price ($P_0$) reflects the cumulative expected amount of underpricing and the perceived future IPO activity during the contract period.

New IPO trades: Once a new IPO enters the market, a part of the expected amount of underpricing during the contract period ($u_1$) is realized. The Price of the Contract ($P_1$) reflects the realized amount of underpricing ($u_1$) plus the expected amount of underpricing in the future ($e_1$).

Another New IPO trades: With further IPO entering the market, a bigger portion of the expected value of underpricing is realized. The Price ($P_2$) of the contract now represents the amount of underpricing of past IPOs ($u_1+u_2$) plus any further expected value of underpricing ($e_2$).

Contract expires: At the end of the contract period, the settlement Price ($P_T$) will reflect the cumulative absolute value of money left on the table ($u_1+u_2$). No additional uncertainty is being priced into this contract ($e_T=0$). The expected level of underpricing will be rolled over into the contract with the next expiration cycle.

In one implementation, the information reflected in the price of a derivative based on the IPO index UPI may include the following, for example.

Nominal Value of Underpricing of Past IPOs: One component of the price of the IPO index UPI Derivatives contract is the nominal amount of underpricing of IPOs which went public during the contract period.

Expected IPO Activity: An expected level of IPO Activity relates to the perceived cumulative value of underpricing over time. This expectation is formed by pooling the information about a number of factors: These include the level of the stock market, generally highly correlated with IPO Activity, the expectation of future IPOs as reflected in the current or past SEC IPO filings or the activity during the bookbuilding period. The volatility of this expectation is likely to decline as the IPO date approaches. Moreover, as the time window towards the expiration of the contract narrows, the expectation itself will decline towards zero.

Average Expected Underpricing in the IPO market: The average expected underpricing of the IPOs along with the total IPO Activity gives an estimate of the total expected money left on the table. The influence of large IPOs is typically greater than the influence of small IPOs: Large IPOs— generally associated with a smaller percentage of underpricing—leave more absolute money on the table.

Figure 12:
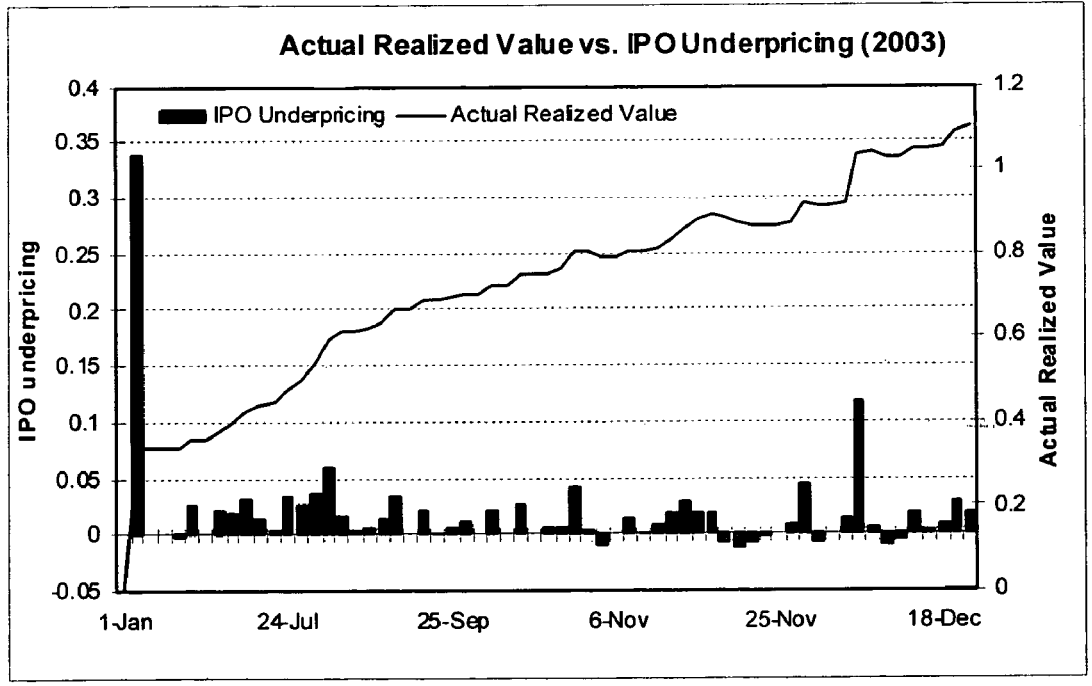
FIG. 12 illustrates actual realized value verses IPO underpricing according to one embodiment of the present invention.

Despite relatively low IPO activity during 2003, IPO's were underpriced by a substantial amount. FIG. 12 shows the dynamics of the actual realized value of underpricing during the 2003 calendar year. The left scale of the Y-axis shows the IPO underpricing indicator (UPI) and the right scale of the Y-axis shows the actual realized value. The X-axis shows the time line through the last part of 2003, and for 1 Jan. 2003. In 2002, companies raised more than double the amount that was raised in 2003; however, the money left on the table in 2002 was about $1.1 billion, which was a level similar to that of 2003.

During 2003, older companies from a broad range of industries went public. The average public float of these companies was 33.4 percent. For the 65 IPO companies during 20003, the total amount money of money left on the table through underpricing in 2003 was $1.12 billion.

As described, the present invention is directed to embodiments of systems and methods for indexing IPO data. For simplicity, the basic components of such systems and methods are provided. However, as would be understood by one of ordinary skill in the art, the systems and methods described below may include various other structures and/or processes in actual implementation.

The methods may be implemented by any suitable type of hardware (e.g., device, computer, computer system, equipment, component); software (e.g., program, application, instruction set, code); storage medium (e.g., disk, device, propagated signal); or combination thereof.

Figure 13:
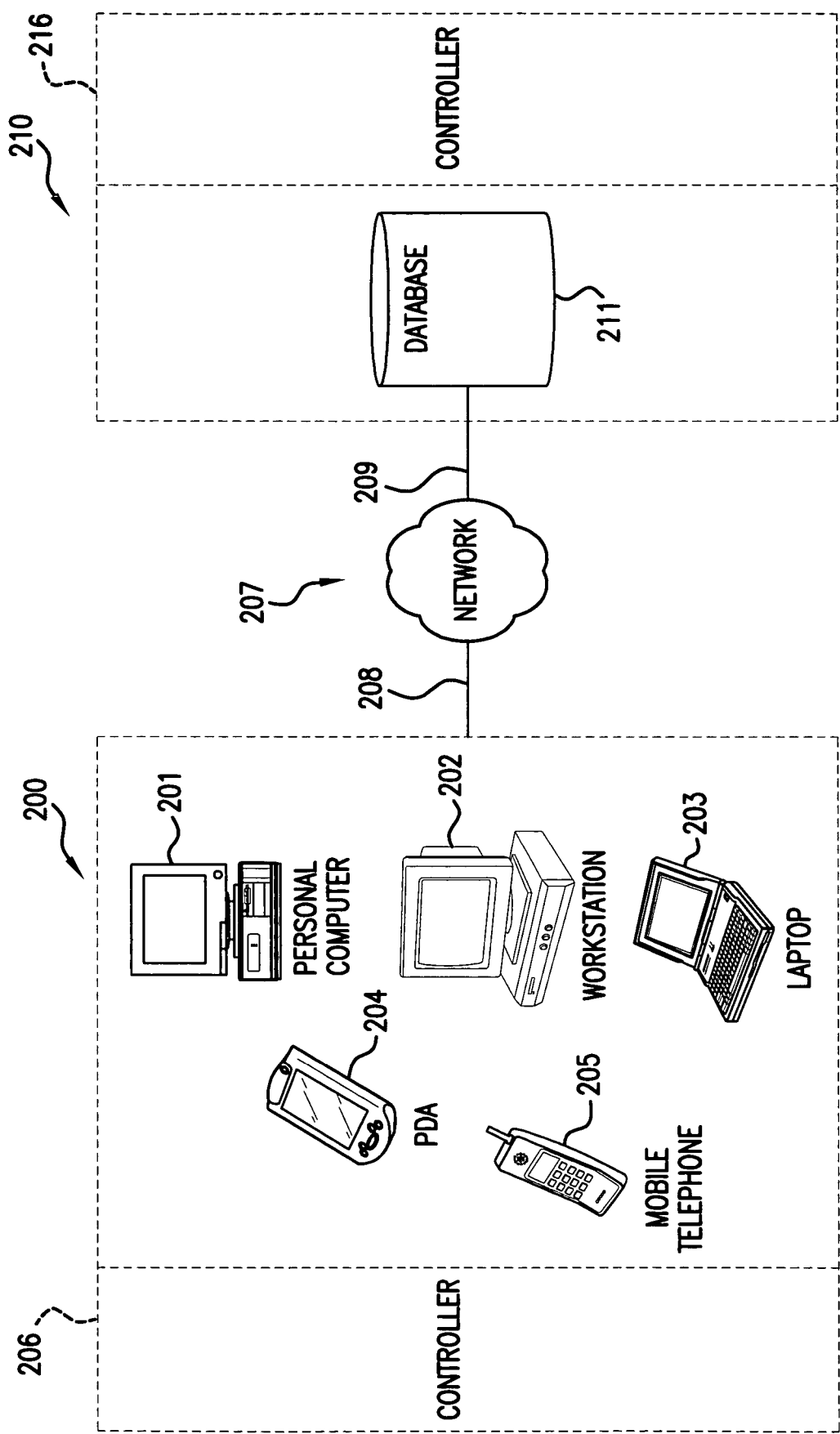
FIG. 13 illustrates a system according to one embodiment the present invention.

FIG. 13 illustrates one embodiment of a communications system in which aspects of the present invention may be used. In general, the communications system may be configured to generate, process, and maintain data for a loan option model.

As shown, the communications system includes a client system 200 for presenting information to and receiving information from a user. The client system 200 may include one or more client devices such as, for example, a personal computer (PC) 201, a workstation 202, a laptop computer 203, a network-enabled personal digital assistant (PDA) 204, and a network-enabled telephone 205. Other examples of a client device include, but are not limited to a server, a microprocessor, an integrated circuit, or any other component, machine, tool, equipment, or some combination thereof capable of responding to and executing instructions.

In one implementation, the client system 200 operates under the command of a client controller 206. The broken lines are intended to indicate that in some implementations, the client controller 206, or portions thereof considered collectively, may instruct one or more elements of the client system 200 to operate as described. Examples of a client controller 206 include, but are not limited to a computer program, a software application, computer code, set of instructions, plug-in, applet, microprocessor, virtual machine, device, or combination thereof, for independently or collectively instructing one or more computing devices to interact and operate as programmed.

The client controller 206 may be implemented utilizing any suitable computer languages (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 106 (e.g., software application, computer program) may be stored on a computer-readable medium (e.g., disk, device, and/or propagated signal) such that when a computer reads the medium, the functions described herein are performed.

In general, the client system 200 may be connected through a network 207 having wired or wireless data pathways 208, 209 to host system 210. The network 207 may include any type of delivery system including, but not limited to a local area network (e.g., Ethernet), a wide area network (e.g. the Internet and/or World Wide Web), a telephone network (e.g., analog, digital, wired, wireless, PSTN, ISDN, and/or xDSL), a packet-switched network, a radio network, a television network, a cable network, a satellite network, and/or any other wired or wireless communications network configured to carry data. The network 207 may include elements, such as, for example, intermediate nodes, proxy servers, routers, switches, and adapters configured to direct and/or deliver data.

In general, the client system 200 and the host system 210 each include hardware and/or software components for communicating with the network 207 and with each other. The client system 201 and host system 210 may be structured and arranged to communicate through the network 207 using various communication protocols (e.g., HTTP, TCP/IP, UDP, WAP, WiFi, Bluetooth) and/or to operate within or in concert with one or more other communications systems.

In one implementation, the host system 210 operates under the command of a host controller 212. The broken lines are intended to indicate that in some implementations, the host controller 212, or portions thereof considered collectively, may instruct one or more elements of host system 210 to operate as described. Examples of a host controller 212 include, but are not limited to a computer program, a software application, computer code, set of instructions, plug-in, microprocessor, virtual machine, device, or combination thereof, for independently or collectively instructing one or more computing devices to interact and operate as programmed.

In general, host controller 212 may utilize any suitable algorithms, computing languages (e.g., C, C++, Java, JavaScript, Visual Basic, VBScript, Delphi), and/or object-oriented techniques and may be embodied permanently or temporarily in any type of computer, computer system, device, machine, component, physical or virtual equipment, storage medium, or propagated signal capable of delivering instructions. The host controller 212 when implemented as software or a computer program, for example, may be stored on a computer-readable medium (e.g., device, disk, or propagated signal) such that when a computer reads the medium, the functions described herein are performed.

The host system 210 generally provides a set of resources for a group of users. As shown, the host system 210 may include a database 211 existing on one or more servers (e.g., IBM® operating system servers, Linux operating system-based servers, Windows NT™ servers, Sybase) within the host system 210.

Derivative financial products based on an IPO index, or on an IPO Index Performance Curve (PC), or on an Underpricing Indicator (UPI), may include an option, a futures contract, an index annuity, an exchange-traded fund (ETF), a closed-end fund, an open-end fund, an equity-linked note, an unit investment trust, or other products.

A number of implementations have been described. Nevertheless, it will be understood that various modifications may be made and that other implementations are within the scope of the following claims.

What is claimed is:

1. A computer-implemented method of providing an index of initial public offerings (IPOs), the method comprising:
    evaluating, using a computer system, IPOs for a period of time after their first trading day;
    calculating, using the computer system, an initial return performance for each IPO during the period of time after their first trading day;
    selecting a set of IPOs for inclusion in the IPO index, the IPOs being included based on at least two eligibility parameters including a minimum market capitalization and a predetermined characteristic of their respective initial return performance;
    excluding, using the computer system, IPOs from the IPO index after a predetermined time period, wherein the predetermined time period is between 900 and 1,100 trading days;
    selecting, using the computer system, an index start date and base value;
    acquiring, using the computer system, price data and weighting data for the included IPOs;
    determining, using the computer system, first adjustment factors associated with any new exclusion of an IPO from the selected set of IPOs;
    determining, using the computer system, second adjustment factors associated with any new inclusion of an IPO in the selected set of IPOs;
    computing, using the computer system, an index value based at least in part on the index start date and base value, the acquired price data and weighting data, and the determined first and second adjustment factors; and
    storing the computed index value in a database of the computer system.

2. The method of claim 1, wherein the subset of IPOs further share a predetermined characteristic of size, sector, public float, age, or geographic location.

3. The method of claim 1, wherein the IPO index satisfies regulatory requirements for a broad based index.

4. The method of claim 3, wherein the IPO index is a broad based index including at least 20 stocks.

5. The method in claim 4, wherein the IPO index comprises more than fifteen firms represented in the index, wherein the weight of the firm with a highest weight in the index is less than 30% of an overall weight of the index, wherein a combined weight of the top five firms in the index is less than 60% of the overall weight of the index, and wherein a dollar value of a daily trading volume of the firms in the bottom 25% of the index by weight is greater than $50,000,000.

6. The method of claim 1, wherein the IPO index is a broad based index including at least 20 stocks.

7. The method in claim 1, wherein the IPO index comprises more than fifteen firms represented in the index, wherein the weight of the firm with a highest weight in the index is less than 30% of an overall weight of the index, wherein a combined weight of the top five firms in the index is less than 60% of the overall weight of the index, and wherein a dollar value of a daily trading volume of the firms in the bottom 25% of the index by weight is greater than $50,000,000.

8. The method of claim 1 further comprising determining, using the computer system, reconstitution dates for the IPO index, wherein the IPO index may be reconstituted on a periodic basis selected from the group including a weekly, monthly, quarterly and annual basis.

9. The method of claim 1, wherein determining, using the computer system, first adjustment factors associated with any new inclusion of an IPO in the selected set of IPOs uses the formula:

$$A^{n+1} = (^n\Sigma_{i=1} P_{i,t} \times Q_{i,t}) / (^{n-1}\Sigma_{i=1} P_{i,t} \times Q_{i,t})$$

wherein first adjustment factor $A^{n+1}$ is the first adjustment factor, t is time, a number of IPOs at time=t is n, at time t+1 an IPO labeled n gets de-listed or exceeds the predetermined time period the IPO can stay in the IPO index, $P_{i,t}$ is a price and $Q_{i,t}$ is a weighting of an $i^{th}$ constituent of the IPO index on a day T.

10. The method of claim 1, wherein determining, using the computer system, second adjustment factors associated with any new inclusion of an IPO in the selected set of IPOs uses the formula:

$$A^{n+1} = (^n\Sigma_{i=1} P_{i,t+1} \times Q_{i,t+1}) / (^{n-1}\Sigma_{i=1} P_{i,t+1} \times Q_{i,t+1})$$

wherein second adjustment factor $A^{n+1}$ is the second adjustment factor, t is time, a number of IPOs at time=t is n, at time t+1 an IPO labeled n+1 gets de-listed or exceeds the predetermined time period the IPO can stay in the IPO index, $P_{i,t}$ is a price and $Q_{i,t}$ is a weighting of an $i^{th}$ constituent of the IPO index on a day T.

11. The method of claim 1, wherein computing, using the computer system, an index value based at least in part on the index start date and base value, the acquired price data and weighting data, and the determined first and second adjustment factors, uses the formula:

$$I_T = \left[\left(\sum_{i=1}^{n} P_{i,T} \times Q_{i,T}\right) \bigg/ \left(\sum_{i=1}^{n} P_{i,0} \times Q_{i,0} \prod_{t=1}^{T} A_t\right)\right] \times I_0$$

wherein $I_0$ is the index value at a base date, $P_{i,0}$ is a price and $Q_{i,0}$ is a weighting of the $i^{th}$ constituent in the IPO index on the base date, $I_T$ is an index level calculated at a day T after the base day, $P_{i,t}$ is the price and $Q_{i,t}$ is the weighting of an $i^{th}$ constituent in the IPO index on the day T, and $$\prod_{t=1}^{T} A_t$$

is a weighting adjustment factor.

12. The method of claim 11, wherein the weighting adjustment factor $A_t$ is calculated using the formula:

$$A_t = (^n\Sigma_{i=1} P_{i,t-1} \times Q_{i,t}) / (^n\Sigma_{i=1} P_{i,t-1} \times Q_{i,t-1})$$

wherein $P_{i,t}$ is the price and $Q_{i,t}$ is the weighting of the $i^{th}$ constituent in the IPO index on the day T.

* * * * *